United States Patent [19]
Fox et al.

[11] Patent Number: 5,473,872
[45] Date of Patent: Dec. 12, 1995

[54] ANGLED DRIVE FOR AN AGRICULURAL HEADER ASSEMBLY

[75] Inventors: Thomas R. Fox; Lawrence Ramsay, both of Winnipeg, Canada

[73] Assignee: MacDon Industries Ltd., Winnipeg, Canada

[21] Appl. No.: 346,931

[22] Filed: Nov. 23, 1994

[51] Int. Cl.$^6$ .................................................. A01D 34/76
[52] U.S. Cl. ............................ 56/14.9; 56/15.7; 56/15.3; 180/53.1
[58] Field of Search .................................. 56/15.7, 15.3, 56/15.1, 15.2, 14.9, DIG. 14; 180/53.1, 53.3

[56] References Cited

U.S. PATENT DOCUMENTS

| | | | |
|---|---|---|---|
| 4,194,756 | 3/1980 | Van Der Lely | 280/461 |
| 4,771,842 | 9/1988 | Mishio et al. | 180/75.2 |
| 4,862,987 | 9/1989 | Legueu | 180/233 |
| 5,127,214 | 7/1992 | Colistro | 56/17.1 |
| 5,158,500 | 10/1992 | McLean | 180/53.1 |
| 5,186,271 | 2/1993 | McLean | 180/14.4 |

*Primary Examiner*—Terry Lee Melius
*Assistant Examiner*—Heather Chun Shackelford
*Attorney, Agent, or Firm*—Adrian D. Battison; Murray E. Thrift

[57] ABSTRACT

A header is mounted on a separate tractor and takes drive from a PTO shaft of the tractor and communicates the drive to a main drive shaft of the header longitudinal of the main beam of the header. The angle drive necessary to communicate this power is formed by three CV joints. A first CV joint is connected to the PTO shaft and a third CV joint is connected to the main drive shaft of the header. Between the first and third CV joints is provided a first shaft extending to the second CV joint and a second shaft from the second CV joint to the third CV joint. The first shaft is carried on a hanger bearing which can pivot about a horizontal axis with the first shaft mounted in a spherical bearing on the hanger bearing plate. The second shaft is telescopic. The three CV joints pivot to divide the total angle approximately equally so that each can run within a reasonable angle. The pivoting hanger bearing and the telescopic shaft accommodate relative movement between the tractor and the header.

8 Claims, 2 Drawing Sheets

ANGLED DRIVE FOR AN AGRICULURAL HEADER ASSEMBLY

This invention relates to an agricultural header assembly of the type for cutting a standing crop and comprising a header frame extending substantially across the full width of the header, cutter bar means supported from the frame and crop transport means supported from the frame rearwardly of the cutter bar for transporting the cut crop across the header to a discharge location, and particularly to a drive transmission system for communicating drive from a forwardly projecting PTO shaft of a tractor to a main drive shaft of the header longitudinal of the main frame.

BACKGROUND OF THE INVENTION

A conventional header of this type generally includes a main drive shaft mounted on the rear of the main longitudinal beam of the header for communicating drive to one or more of the driven elements of the header including the knife drive of the cutter bar, the rotating reel and the transport means which transports the crop longitudinally of the header. It is of course necessary to communicate power from the tractor vehicle on which the header is transported to the main drive shaft.

The header can be mounted directly on a swather tractor in which case the mounting system includes arms which effect lifting of the header and in addition allow floating movement of the header to accommodate changes in ground height. It is also known to mount a header of this type on a reversible tractor so that the tractor is basically driven in reverse with an adapter specially provided between the three point hitch of the tractor and the header, the three point hitch providing vertical lift of the adapter and the header being mounted on the adapter for floating movement.

In both of these designs the tractor includes a PTO shaft which projects forwardly of the direction of movement of the tractor that is generally at right angles to the longitudinal beam of the header along which the drive shaft lies.

It is necessary, therefore, to provide an angle drive assembly which communicates the drive from the PTO shaft around approximately 90° to the main drive shaft of the header. Generally this angled drive arrangement includes a right angle gear box mounted on the header frame with an input shaft which can tilt relative to the gear box to accommodate movement of the gear box relative to the PTO shaft. This drive is relatively complex and expensive leading to an overall increased cost for the manufacture of the machine.

A constant velocity (CV) joint is a well known construction which includes two universal joints arranged back to back with an interconnecting coupler. An input to one of the universal joints is taken from an input shaft and an output from the CV joint is taken from the output of the second universal joint. The coupler between the two universal joints rotates with the input and output but at a variable speed. The symmetry of the device allows the output to be rotated at constant speed relative to the input while the changes or variations in speed are accommodated in the coupler.

CV joints are regularly used to communicate drive from an input shaft to an output shaft at a relatively shallow angle between the input and output shafts. CV joints can accommodate changes in the angle between the input and output shafts. Designs are available of CV joint which allow the drive line angle to flex up to 50° with a suitable lifetime of operation obtainable when the joint is normally maintained in the 0° to 40° range.

It is known to connect two CV joints back to back to provide an increased angle in the drive line of greater than 50°. In addition joints are available which can accommodate flexing of the drive line up to 80° but these joints are significantly more expensive.

Multiple universal joints have been used to transmit low power through angles greater than 90°. For example a rod weeder is a conventional tillage cultivator with a rod supported across the back of the cultivator so that when the cultivator is engaged in the ground, the rod is just below the surface of the ground. The rod is rotated in the direction opposite to the ground wheel so that weeds are pulled out of the loose soil and deposited on top of the soil. The rod is usually driven by the cultivator wheels through a series of universal joints that transmit the power through an angle of approximately 180°.

Up till now it is believed that joints of this type have not been used in agricultural machines to provide communication through an angle of the order of 90° of the significant amounts of power necessary to drive the elements of the header or the like.

SUMMARY OF THE INVENTION

It is one object of the present invention, therefore, to provide an improved drive system for communicating drive from the PTO shaft of the tractor vehicle to the main drive shaft of the header.

According to one aspect of the invention there is provided an agricultural header assembly for cutting a standing crop comprising a header frame including a main elongate frame structure extending substantially across a full width of the header, cutter bar means supported from the frame structure and extending along a front edge of the header for cutting the standing crop, crop transport means supported from the frame structure arranged rearwardly of the cutter bar means for transporting the cut crop across the header to a discharge location, mounting means for mounting the header on a tractor for movement by the tractor through the standing crop and a power transmission assembly for communicating driving power from a PTO shaft of the tractor to at least one of the transport means and the cutter bar means, the power transmission assembly comprising a main drive shaft extending generally longitudinally along the frame structure having a drive shaft axis longitudinal of the frame structure about which the main drive shaft rotates and first input coupling means on an end of the main drive shaft, and an angle drive assembly having first output coupling means thereon connected to said first input coupling means of the main drive shaft for rotation about the drive shaft axis, second input coupling means arranged for connection to said PTO shaft for rotation about a PTO axis at right angles to the frame structure, a first, a second and a third CV joint, each having an input end and an output end, the first CV joint having said second input coupling means, a first rigid drive line connected at one end thereof to said output end of said first CV joint and connected at a second end thereof to said input end of said second CV joint, a second rigid drive line connected at one end thereof to said output end of said second CV joint and connected at a second end thereof to said input end of said third CV joint, the third CV joint having said first output coupling means at said output end thereof, one of said first and second drive lines being telescopic and a hanger bearing mounted on the other of the first and second drive lines, the hanger bearing including a bracket mounted on one of the mounting means and the frame structure and a bearing carried by the bracket within which the other of the first and second drive lines can rotate relative to the bracket, the bracket being arranged to define an axis of rotation of said other of the first and second drive lines which lies at an angle to said drive shaft axis and to said PTO axis.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
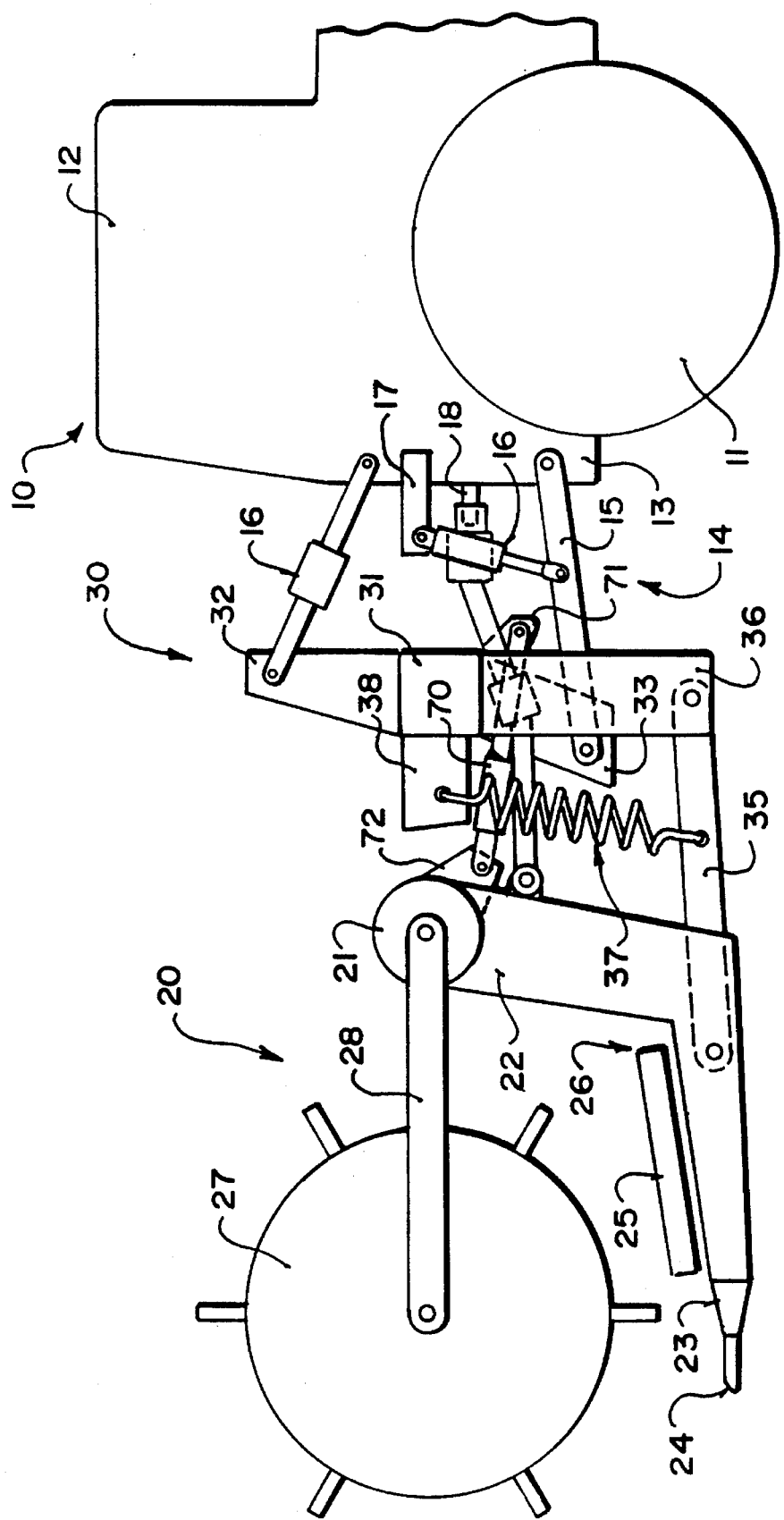
FIG. 1 is a schematic side elevational view showing a header assembly according to the present invention attached to the three point hitch of a reversible tractor.

A conventional tractor is indicated at 10 including rear ground drive wheels 11, a cab 12 and a rear frame section 13 on which is mounted a conventional three point hitch 14 including lower lift arms 15 and a top link 16. The lower lift arms 15 are mounted on the frame 13 for pivotal movement in a lifting action and each lift arm 15 is lifted by a hydraulic cylinder 16 carried on a rigid support arm 17. The tractor further includes PTO shaft 18. All of the elements of the tractor are of course conventional and one example of a device of this type is the Ford/Versatile bi-directional tractor.

A conventional header is also shown in FIG. 1 and indicated at 20 and includes a main longitudinal frame beam 21 extending across the full width of the header. The main frame including support struts 22 which carry a cutter bar 23 including a sickle knife 24 for cutting action on a standing crop. The header further includes a crop transport system which in this example comprises a draper assembly 25 for transporting the crop longitudinally across the header to a discharge opening 26. The header further includes a reel 27 mounted on reel arms 28 carried on the beam 21. Details of the header are shown only schematically since these are again well known to one skilled in the art and one example of a device of this type is manufactured by the present Assignees MacDon under the trademark "Harvest Header".

In order that the header is carried on the above tractor, there is provided an adapter 30 in the form of a main beam 31 which carries a centre brace 32 for pivotal attachment to the link 16 and two depending braces 33 each for attachment to a respective one of the lift arms 15. The beam 31 is thus carried on the three point hitch in a horizontal orientation the height of which can be adjusted in conventional manner by lifting the three point hitch. The beam also provides a pair of header support arms 35 each of which projects forwardly from the beam and is mounted for pivotal movement on a bracket 36. The arm 35 is carried on springs 37 attached to braces 38 so that the arms can float under the spring action. The arms attach to the header adjacent the lower part of the braces 22 and thus support the main beam 21. A top link 70 has a pivotal attachment to a bracket 71 on the adapter frame tube 21. This link 70 is adjustable in length to vary the header angle with respect to the adapter frame. Again the details of the adapter are shown only schematically as these will be well known to one skilled in the art and an adapter of this type is manufactured again by the above Assignees MacDon. As the header is transported across the field, the header and adapter frame are raised and lowered with the three point hitch on the tractor and the header floats relative to the adapter frame.

The present invention is particularly concerned with the drive transmission of the header by which power from the PTO 18 is communicated to a main drive shaft of the header.

In the example shown, the header includes the adapter 30 which allows the header to be mounted on the above particular tractor type. It will be appreciated, however, that the header can be mounted directly on a swather tractor which is designed with the necessary lift arms which provide spring floating action so there is no necessity for the adapter. However in both cases the angle drive arrangement described hereinafter can be used to provide drive transmissions from the PTO shaft of the tractor to the main drive shaft of the header.

The header therefore includes a main drive shaft 40 carried along the back of the main beam 21 on suitable bearings 41. The end of the main drive shaft 40 is splined as indicated schematically at 42 to receive a splined bore of the angle drive line system generally indicated at 43 which forms the subject matter of the present invention.

A similar arrangement is provided at the end of the PTO shaft 18 so that the shaft 18 is splined as indicated 42 to receive a splined bore at the end of the system 43. The splined couplings provide a quick release attachment and detachment arrangement for the system 43 in the drive between the tractor PTO and the main drive shaft 40 of the header.

The drive line system 43 comprises a first CV joint 44, a second CV joint 45 and a third CV joint 46 which are interconnected by a first rigid drive line 47 and a second rigid drive line 48.

Figure 2:
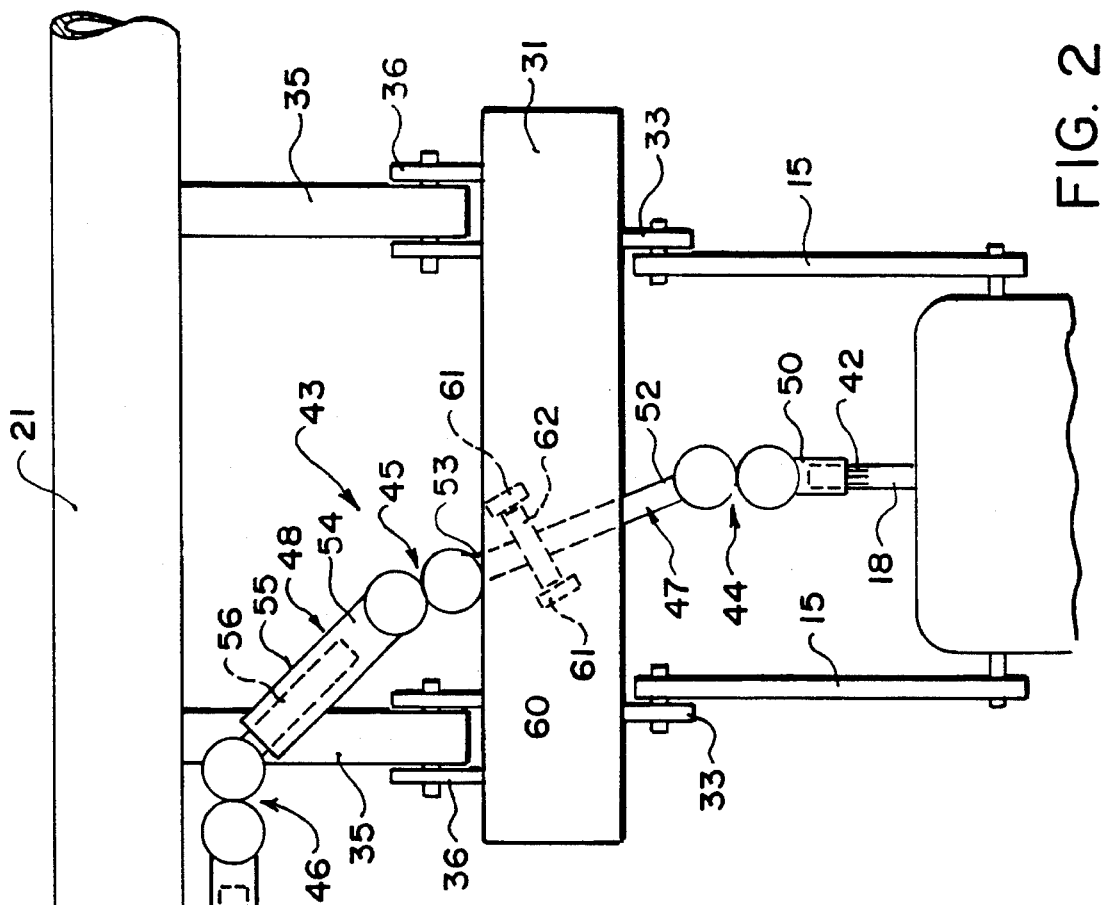
FIG. 2 is a top plan view of the drive assembly of the header of FIG. 1.
Figure 3:
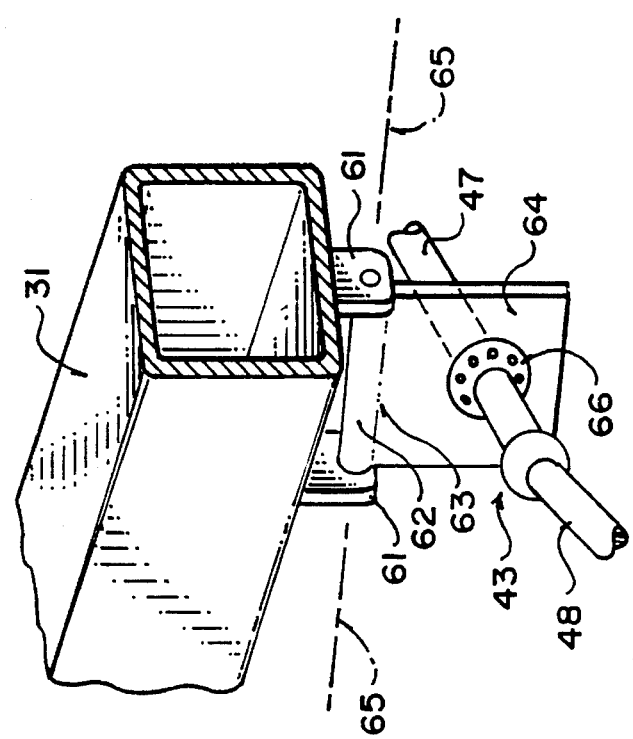
FIG. 3 is an isometric view showing one part of the beam of the adapter and the hanger bearing carrying the adjacent parts of the first and second drive lines.

The CV joint is shown only schematically in FIGS. 2 and 3 as this of course is a well known item which can be readily purchased for example from Weasler Engineering. CV joints include two universal joints which are arranged back to back with an intervening coupling. The universal joints can therefore run at a slight angle each to the next and the coupling therefore bridges that angle and in view of the symmetry of the arrangement is arranged at an equal angle to the first universal joint and to the second universal joint. The coupling member therefore rotates at a varying rate in response to a constant input due to the angle in the universal joint. However due to the symmetry of this structure the output from the CV joint is generally constant. CV joints of this type are available from the above supplier and can accommodate an angle between the input and output which is as much as 50° although it is preferred that the joint operate at lower angles for maximizing the operating lifetime of the joint.

The CV joint 44 therefore has an input end 50 which has the female splined bore for engaging onto the splined section 42 of the shaft 18. The CV joint 44 further includes at its output end 52 a direct connection to the rigid drive line or shaft 47. The other end of the rigid shaft 47 is connected to the input end 53 of the second CV joint 45. The output end of the second CV joint is connected directly to one end of the rigid drive line 48 as indicated at 54. The drive line 48 is formed of a two part telescopic arrangement including an outer sleeve 55 and an inner shaft 56 allowing a telescoping action to accommodate changes in length between the second CV joint 45 and the third CV joint 46. The end of the shaft 56 is thus directly connected to the input end of the CV joint 46. The output end of the CV joint 46 is directly coupled by the female splined bore to the splined section 42 of the main drive shaft 40.

A hanger bearing 60 is attached to the main beam 31 by a pivotal attachment member 61 suspended from the bottom face of the beam 31. The pivotal attachment member 61 comprises a pair of parallel lugs supporting a transverse pin carrying a pivot hinge 62 which connects to an upper edge 63 of a plate 64 forming a bracket of the hanger bearing. The plate 64 is simply a flat plate with the hinge 62 across its upper edge so that the plate can hang downwardly from a horizontal axis defined by the hinge 62. The horizontal axis however lies at an angle of the order of 30° to the front face of the beam 31 and the pivotal attachment member 61 as best shown in FIG. 2 is offset to one side of the centre point of the beam which would normally be aligned with the PTO shaft 18. The plate 64 carries at its center a spherical bearing 66 through which the shaft 47 extends. The spherical bearing 66 allows a longitudinal axis of the shaft 47 to tilt relative to the plane defined by the plate 64. This tilting action can take place about a horizontal line across the plate, about a vertical line across the plate or about a combination of those axes.

The header can therefore be disconnected from the tractor by removing the adapter from the three-point hitch of the tractor and by disconnecting the input shaft 50 from the splined section 42 of the PTO shaft 18. When it is required to attach and drive the header, the header is attached to the three point hitch and the drive system connected to the shaft 18. The hanger bearing 60 supports the shaft 47 generally at an angle to the shaft 18. The shaft 40 supports the CV joint 46. The CV joint 45 is supported at the end of the shaft 47 by the location of the hanger bearing 60 and therefore the shaft 48 is held in a predetermined location. Each CV joint takes up approximately one third of the angle between the shaft 18 and the shaft 40.

Pivotal movement of the adapter relative to the tractor is accommodated by pivoting the hanger bearing about the axis 65 which thus can pull the hanger bearing toward the shaft 18. At the same time the shaft 47 swivels in the spherical bearing 66 to accommodate the rotational movement of the plate 64. Any change in length between the CV joint 45 and the CV joint 46 caused by this movement of the adapter or caused by the main frame 21 relative to the adapter is accommodated by a change in length in the shaft 48. The system is therefore a dynamic system which accommodates the movements of the adapter and the header with the CV joints changing in angle to take up the required division of the total angle of the drive system and the hanger bearing and the shaft 48 varying in position. The angle of each CV joint will vary as the header floats relative to the adapter frame and as the adapter frame is lifted relative to the tractor. The location of and angle of the hanger bearing 60 and the location of the center CV joint 45 at the hanger bearing are arranged so as to minimize the CV joint angles throughout the lift and float ranges.

The angle drive using the three CV joints and the two shafts together with the hanger bearing provides a simple construction which is significantly less expensive than alternative techniques and yet provides the communication of sufficient quantities of power to effect the drive of a header.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. An agricultural header assembly for cutting a standing crop comprising a header frame including a main elongate frame structure extending substantially across a full width of the header, cutter bar means supported from the frame structure and extending along a front edge of the header for cutting the standing crop, crop transport means supported from the frame structure arranged rearwardly of the cutter bar means for transporting the cut crop across the header to a discharge location, mounting means for mounting the header on a tractor for movement by the tractor through the standing crop and a power transmission assembly for communicating driving power from a PTO shaft of the tractor to at least one of the transport means and the cutter bar means, the power transmission assembly comprising a main drive shaft extending generally longitudinally along the frame structure having a drive shaft axis longitudinal of the frame structure about which the main drive shaft rotates and first input coupling means on an end of the main drive shaft, and an angle drive assembly having first output coupling means thereon connected to said first input coupling means of the main drive shaft for rotation about the drive shaft axis, second input coupling means arranged for connection to said PTO shaft for rotation about a PTO axis at right angles to the frame structure, a first, a second and a third CV joint, each having an input end and an output end, the first CV joint having said second input coupling means, a first rigid drive line connected at one end thereof to said output end of said first CV joint and connected at a second end thereof to said input end of said second CV joint, a second rigid drive line connected at one end thereof to said output end of said second CV joint and connected at a second end thereof to said input end of said third CV joint, the third CV joint having said first output coupling means at said output end thereof, one of said first and second drive lines being telescopic and a hanger bearing mounted on the other of the first and second drive lines, the hanger bearing including a bracket mounted on one of the mounting means and the frame structure and a bearing carried by the bracket within which the other of the first and second drive lines can rotate relative to the bracket, the bracket being arranged to define an axis of rotation of said other of the first and second drive lines which lies at an angle to said drive shaft axis and to said PTO axis.

2. The header assembly according to claim 1 wherein the hanger bearing bracket is pivotal relative to said one of the mounting means and the frame structure.

3. The header assembly according to claim 2 wherein the hanger bearing is pivotal about a horizontal axis.

4. The header assembly according to claim 2 wherein the bearing can swivel relative to the bracket to allow said axis of rotation to tilt relative to the bracket.

5. The header assembly according to claim 1 wherein the mounting means includes an adapter, first means mounting the adapter on the tractor for lifting movement relative thereto and second means mounting the frame structure on the adapter for up and down floating movement relative to the adapter.

6. The header assembly according to claim 1 wherein the hanger bearing bracket is pivotal relative to said one of the mounting means and the frame structure and wherein the bearing can swivel relative to the bracket to allow said axis of rotation to tilt relative to the bracket.

7. The header assembly according to claim 6 wherein the hanger bearing is pivotal about a horizontal axis.

8. The header assembly according to claim 1 wherein the hanger bearing is arranged adjacent that end of said other of the first and second drive lines which is adjacent the second CV joint.

* * * * *